(12) United States Patent
Kanazawa

(10) Patent No.: US 10,517,435 B2
(45) Date of Patent: Dec. 31, 2019

(54) MILL DEVICE

(71) Applicant: JAPAN PORLEX & CO., LTD., Osaka (JP)

(72) Inventor: Kazuhiko Kanazawa, Osaka (JP)

(73) Assignee: JAPAN PORLEX & CO., LTD., Kirishima-Shi (JP)

( * ) Notice: Subject to any disclaimer, the term of this patent is extended or adjusted under 35 U.S.C. 154(b) by 0 days.

(21) Appl. No.: 15/308,172

(22) PCT Filed: Dec. 21, 2015

(86) PCT No.: PCT/JP2015/085713
§ 371 (c)(1),
(2) Date: Nov. 1, 2016

(87) PCT Pub. No.: WO2017/109836
PCT Pub. Date: Jun. 29, 2017

(65) Prior Publication Data
US 2018/0279829 A1    Oct. 4, 2018

(51) Int. Cl.
| | |
|---|---|
| *A47J 42/46* | (2006.01) |
| *A47J 42/34* | (2006.01) |
| *A47J 42/00* | (2006.01) |
| *A47J 42/04* | (2006.01) |
| *A47J 42/02* | (2006.01) |

(52) U.S. Cl.
CPC .............. *A47J 42/46* (2013.01); *A47J 42/00* (2013.01); *A47J 42/02* (2013.01); *A47J 42/04* (2013.01); *A47J 42/34* (2013.01)

(58) Field of Classification Search
CPC .. A47J 42/00; A47J 42/02; A47J 42/04; A47J 42/34; A47J 42/46

USPC ............................................... 241/168, 169.1
See application file for complete search history.

(56) References Cited

U.S. PATENT DOCUMENTS

| | | | | |
|---|---|---|---|---|
| 43,374 | A * | 6/1864 | Witmer | B02C 18/0007 241/100 |
| 4,454,922 | A * | 6/1984 | Jamison | E21B 17/03 175/320 |
| 6,367,567 | B1 * | 4/2002 | Massa | E21B 17/00 175/323 |

(Continued)

FOREIGN PATENT DOCUMENTS

| | | | | |
|---|---|---|---|---|
| CN | 2063845 | U | 10/1990 | |
| CN | 203693395 | U * | 7/2014 | ............. A47J 42/00 |
| CN | 203693395 | U | 7/2014 | |

(Continued)

*Primary Examiner* — Shelley M Self
*Assistant Examiner* — Jared O Brown
(74) *Attorney, Agent, or Firm* — Heedong Chae; Lucerne, PC

(57) ABSTRACT

A coffee mill 1 to which the present invention is applied includes a milling unit 2 which mills, with an inner blade 8, coffee beans 5, a drive shaft 3 in which one end is cooperatively coupled to the inner blade 8 and in which on the shaft center 23 of the other end, a rectangular shaft portion 21 is formed that has a predetermined twist around at least part of the shaft center in a shaft center direction and that is rectangular in cross section and an operating handle 4 to which a rectangle shaft hole 22 that is rectangular in plan view is open and which is coupled to the drive shaft 3 by externally fitting the rectangular shaft hole 22 to the rectangular shaft portion 21.

3 Claims, 12 Drawing Sheets

(56) References Cited

U.S. PATENT DOCUMENTS

2004/0124294 A1    7/2004  Ng

FOREIGN PATENT DOCUMENTS

| CN | 204507018 U | 7/2015 |
| CN | 204760205 U | 11/2015 |
| JP | 60-198120 A | 10/1985 |
| JP | 2003-61837 A | 4/2003 |
| JP | 3692984 B2 | 9/2005 |
| JP | 2007-167811 A | 7/2007 |

* cited by examiner

[Fig. 1]
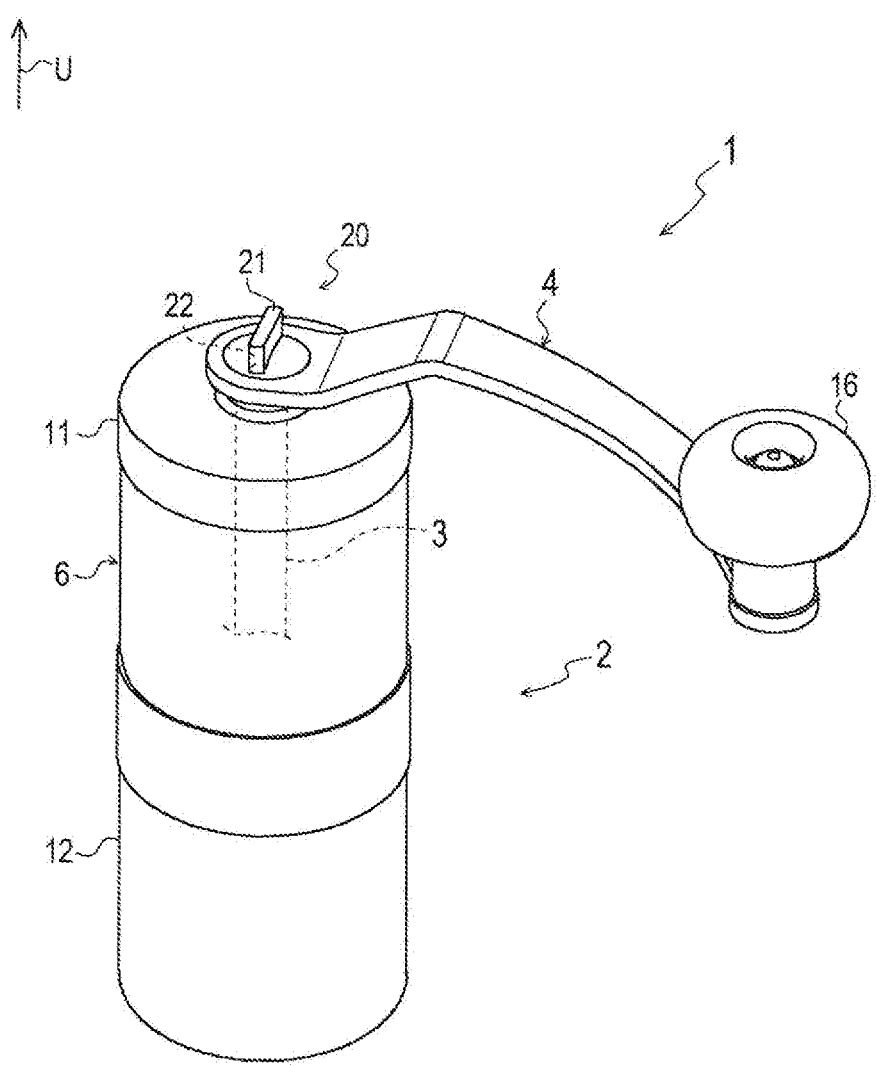

[Fig. 2]
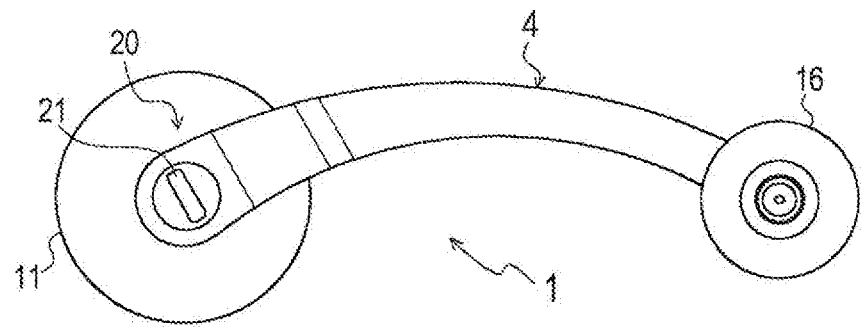
(a)
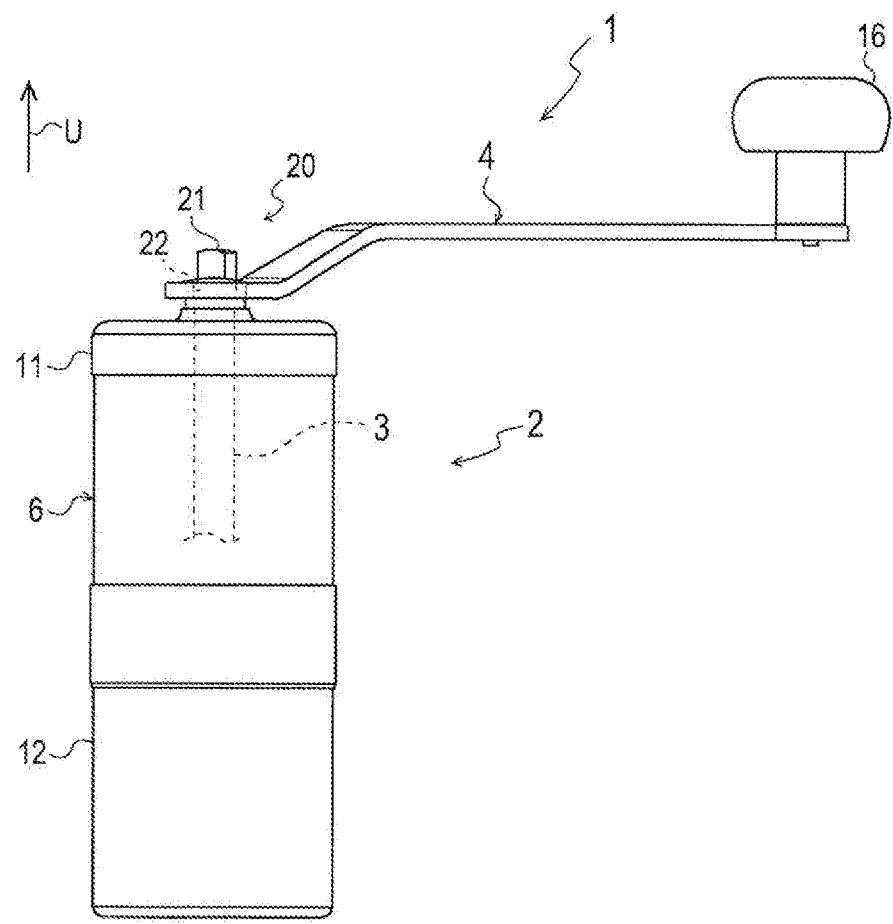
(b)

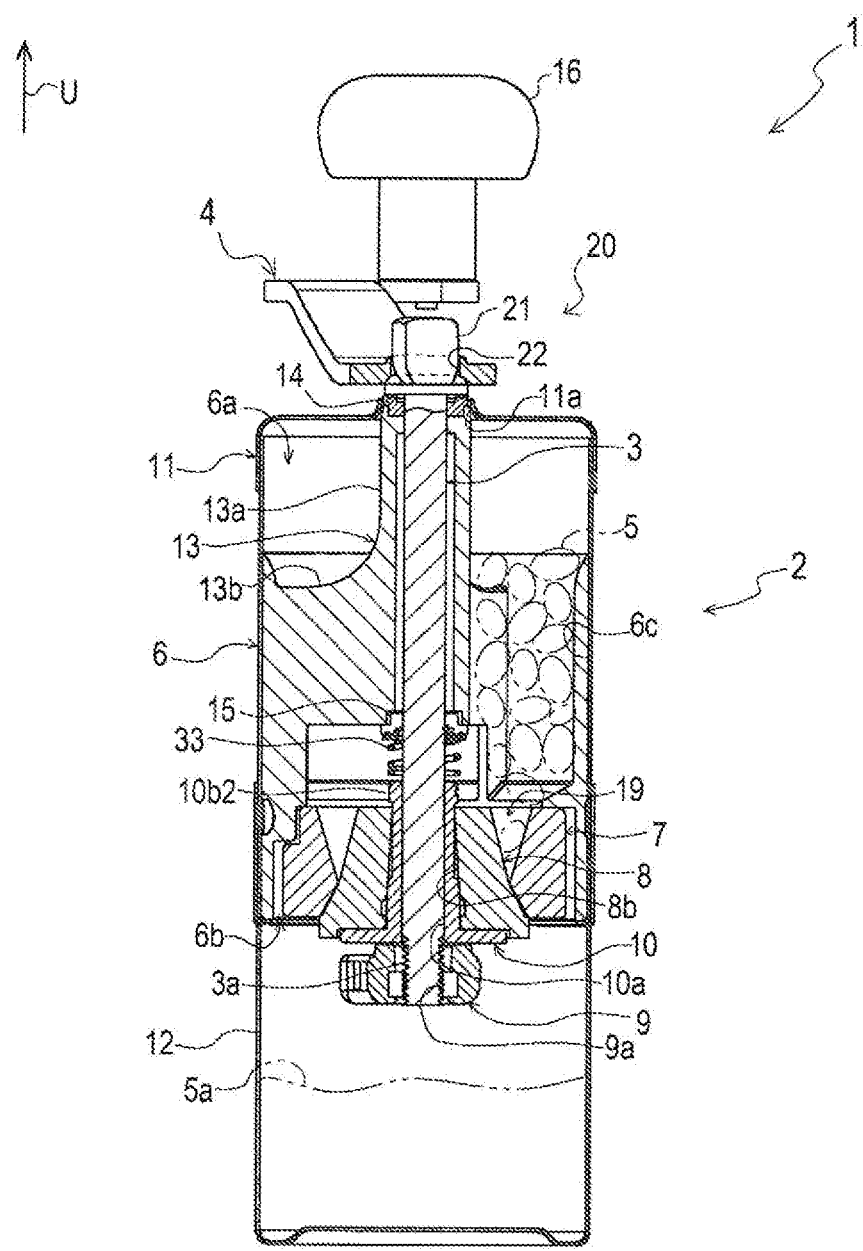
[Fig. 3]

[Fig. 4]
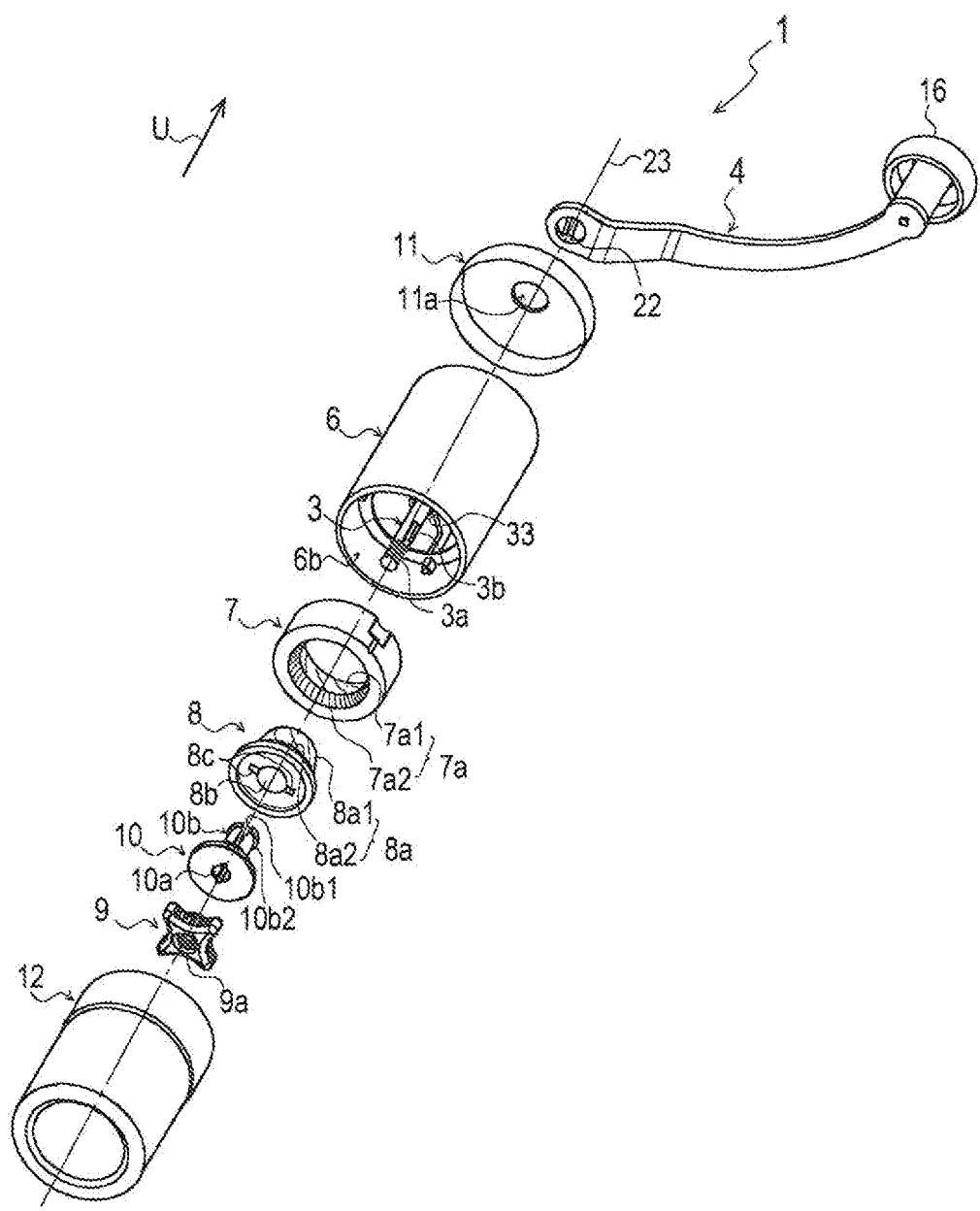

[Fig. 5]
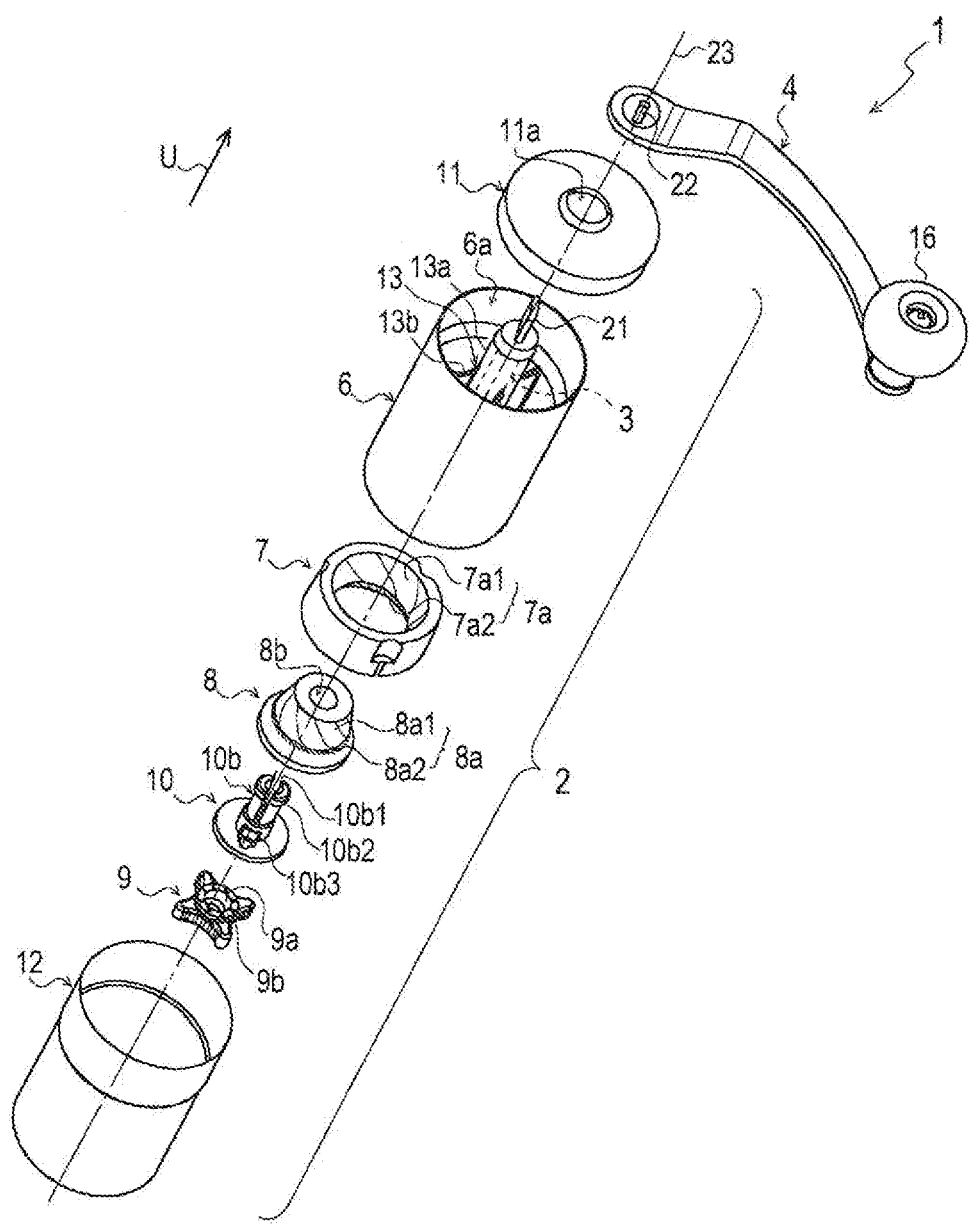

[Fig. 6]
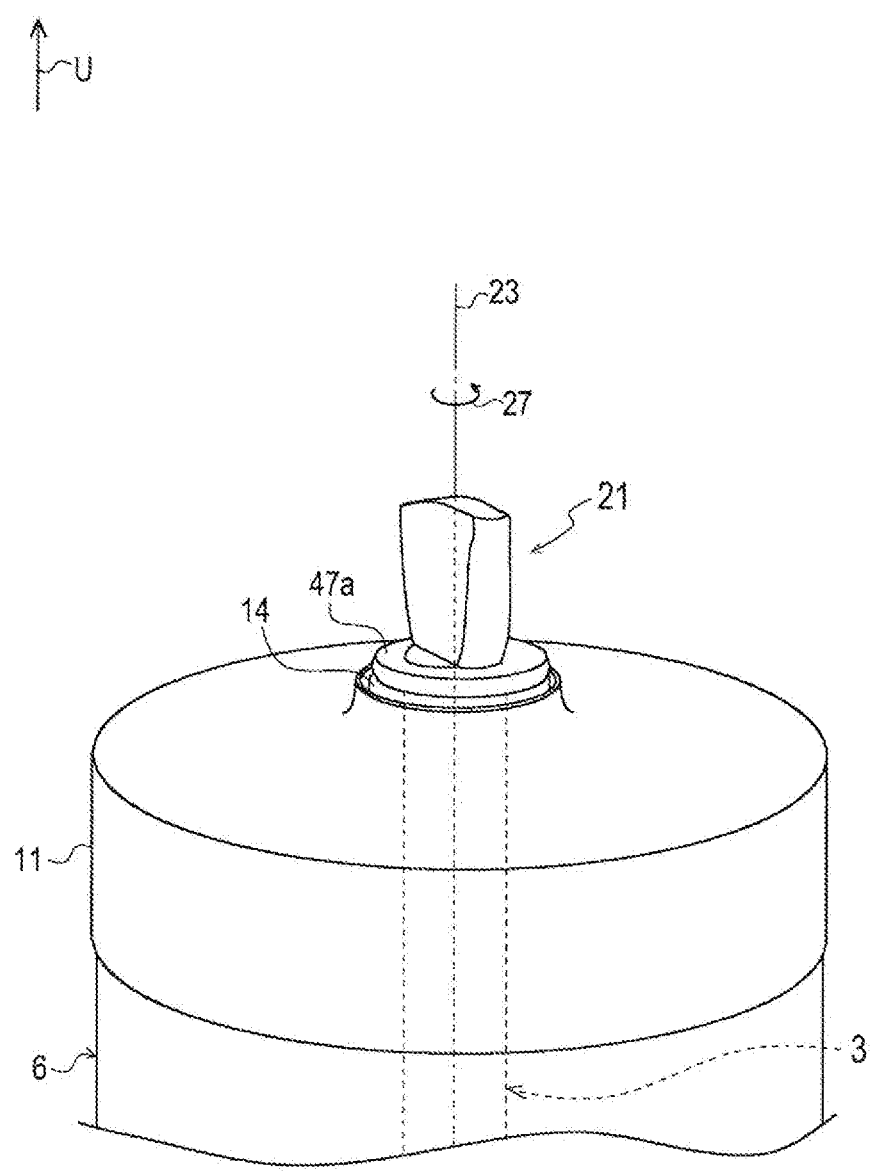

[Fig. 7]
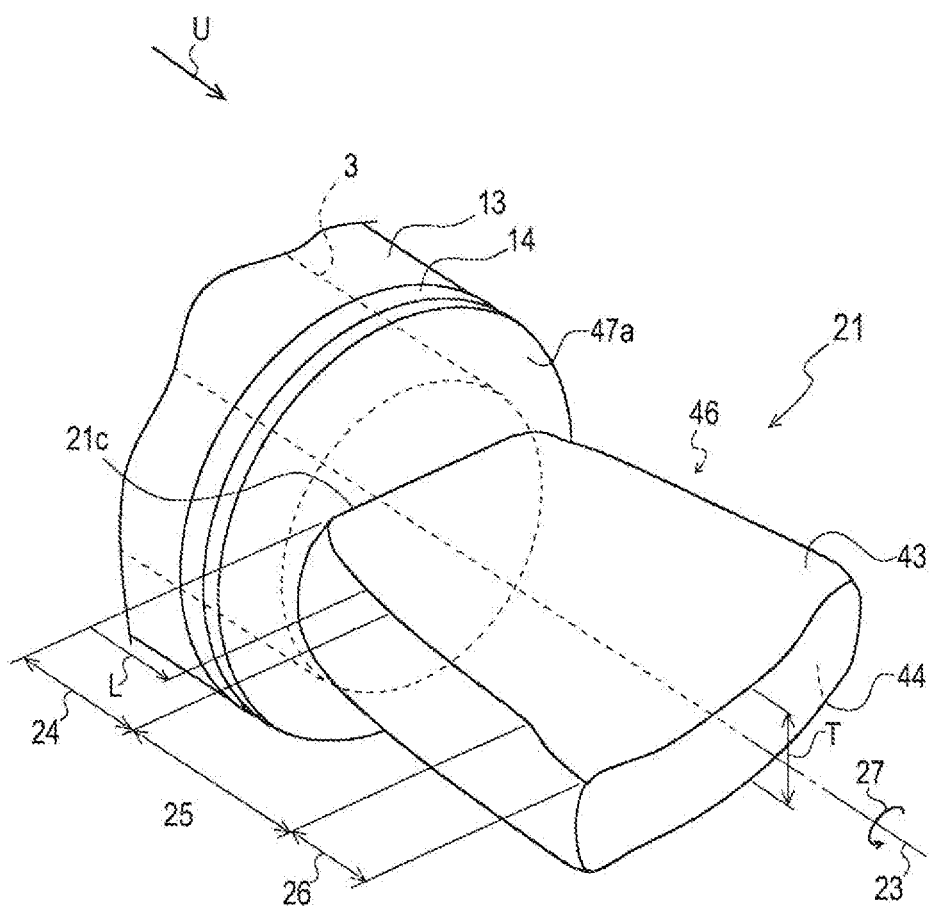

[Fig. 8]
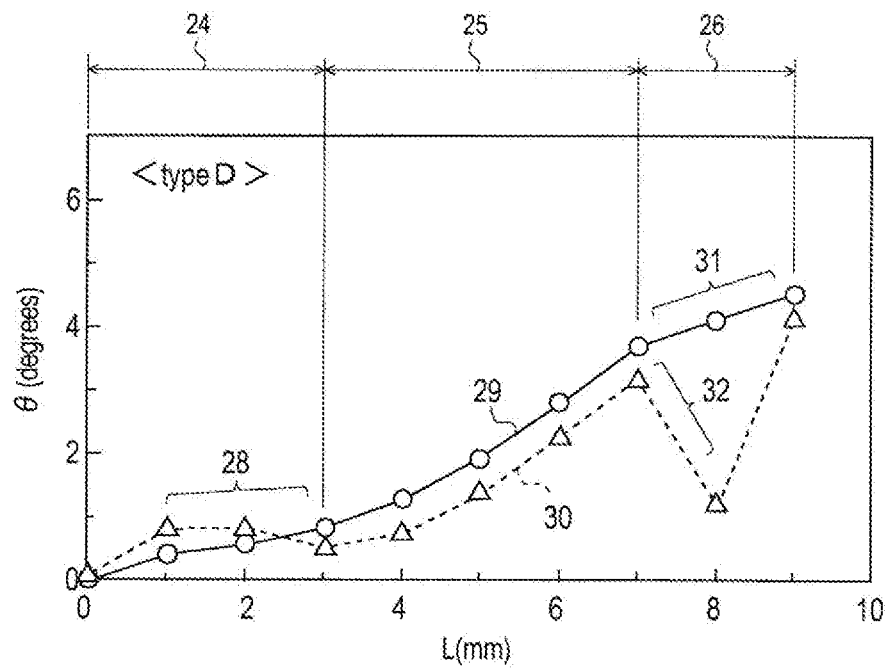

[Fig. 9]
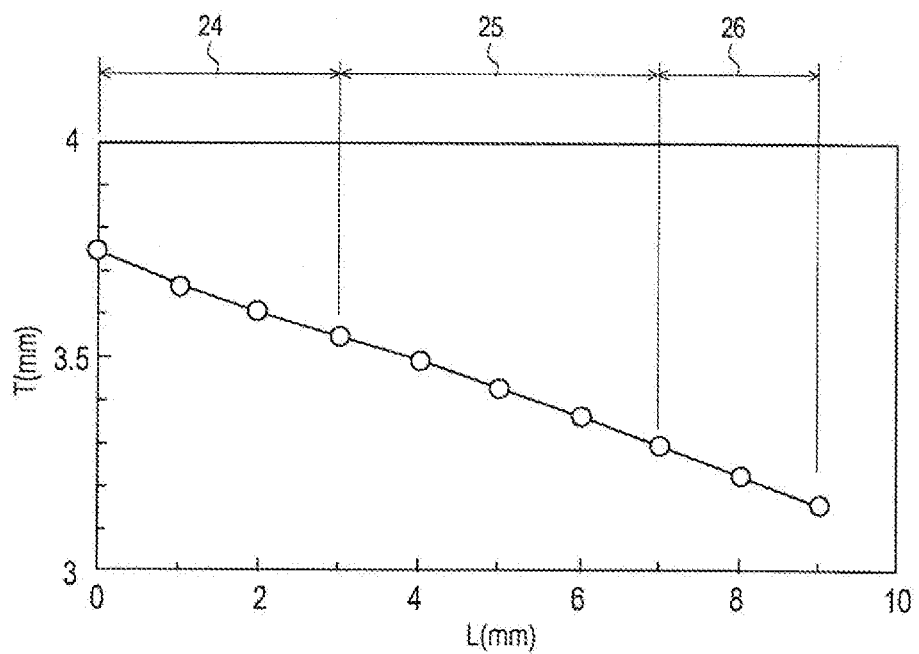

[Fig. 10]
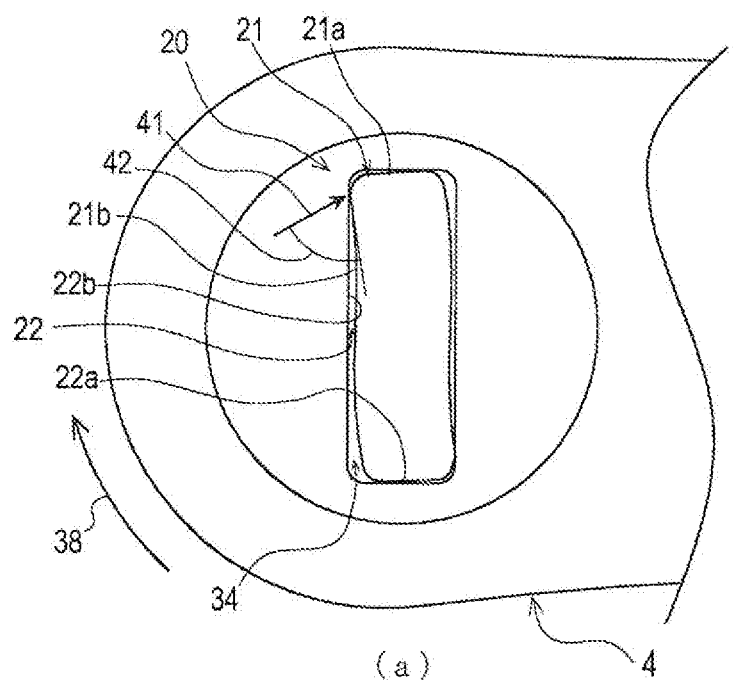
(a)
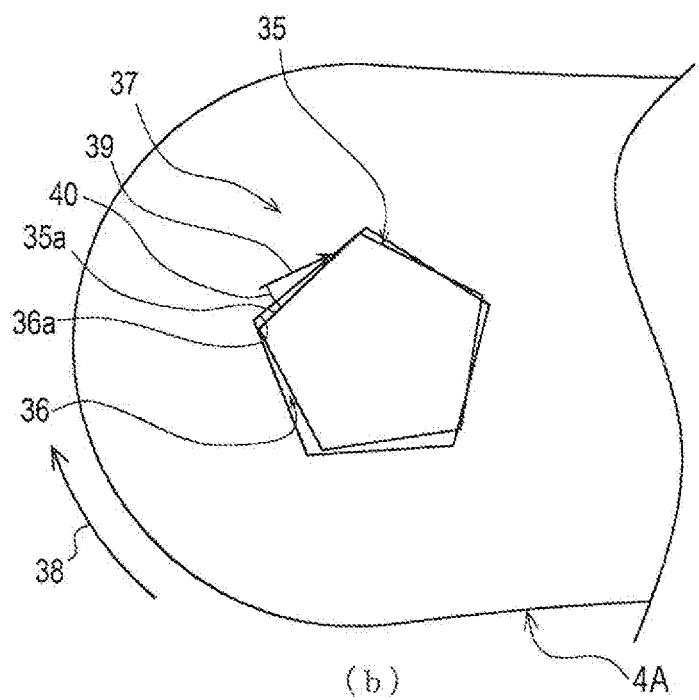
(b)

[Fig. 11]
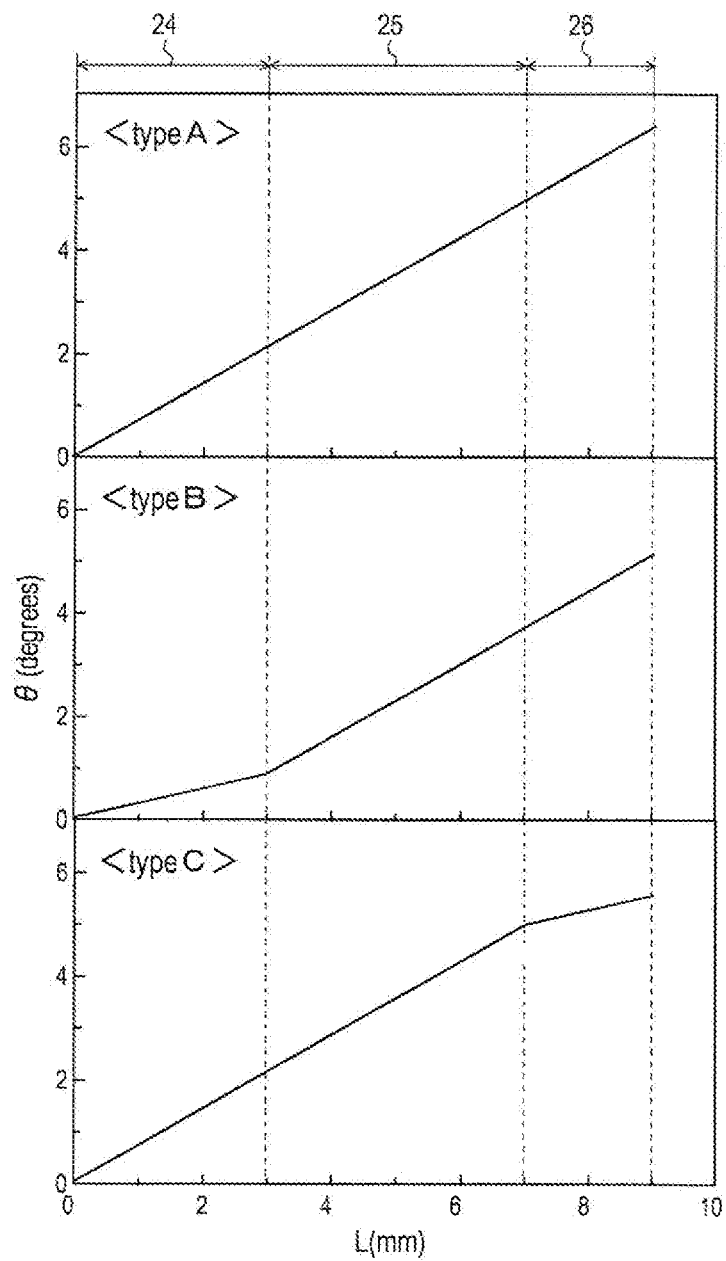

[Fig. 12]
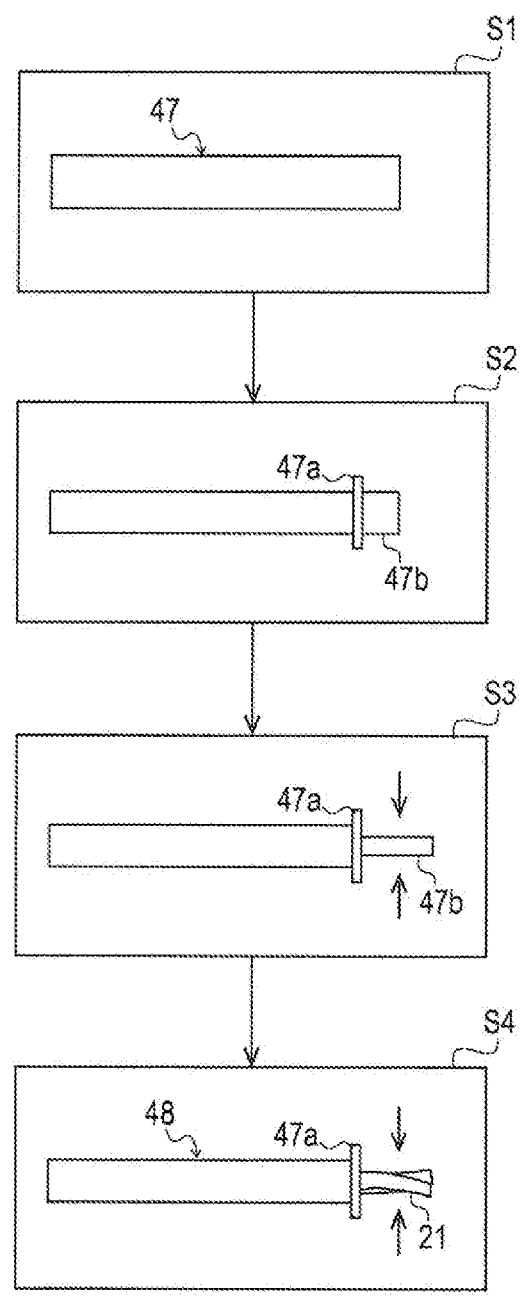

MILL DEVICE

TECHNICAL FIELD

The present invention relates to a manual mill device for grinding coffee beans, spices such as pepper, Japanese pepper and sesame, tea leaves, etc. More specifically, the present invention relates to a mill device which is compact and easy to carry and which can reliably prevent, when the shaft hole of an operating handle is externally fitted to a shaft portion provided at one end of a drive shaft in the mill device so as to perform rotary drive, the operating handle from being idled by wear between the shaft portion and the shaft hole and the operating handle from coming off from the shaft portion.

BACKGROUND ART

Conventionally, a mill device is known in which coffee beans, spices, tea leaves, etc., (hereinafter referred to as an "item to be milled") are put between rotary members such as a blade and a mortar that are opposite each other and in which these rotary members are relatively rotated to perform milling processing. However, in recent years, unlike an electrically operated type in which such rotary drive is performed with an electric motor, etc., demand for a manual mill device has been increasing because power is not necessary and the place of use is not limited. In particular, among the manual mill devices, the demand for a portable mill device is remarkably increased that is further compact and easy to carry as compared with a stationary type in which a heavy main body portion is placed on a table to perform a rotary operation.

A technology is known that in such a manual portable mill device, a milling unit storing the rotary members described above is grasped with one hand, the operating handle is rotated with the other hand and thus the opposite rotary members are relatively rotated to perform milling operation (see, for example, Patent Literature 1).

The operating handle of the manual portable mill device is securely adhered with a screw, etc., to one end of the drive shaft which is cooperatively coupled to the rotary members described above, and is generally significantly protruded laterally from the milling unit. Hence, a large space in which the mill device is accumulated is needed, and thus it is impossible to easily carry the mill device while storing it in a bag, etc., with the result that it is not always possible to secure sufficient portability. Furthermore, in order to replace components such as the consumed rotary member or to repair the milling unit, it is necessary to remove the operating handle adhered and then disassemble the milling unit, with the result that the ease of maintenance is lowered.

Hence, a technology is also known in which in order for the removability of the coupling structure of the drive shaft and the operating handle to be achieved, on the shaft center of the drive shaft, the shaft portion that is formed in the shape of a regular polygon, that is pentagonal or more in cross section, for example, a pentagonal shaft portion or a hexagonal shaft portion is formed, in which in the operating handle, the shaft hole that can be externally fitted to the shaft portion and that is formed in the shape of a regular polygon that is pentagonal or more in cross section is formed and in which the shaft hole is removably externally fitted to the shaft portion.

PRIOR ART DOCUMENTS

Patent Literature

Patent Literature 1: Japanese Published Unexamined Patent Application No. 2003-61837

SUMMARY OF THE INVENTION

Problems to be Solved by the Invention

However, in the manual portable mill device having the coupling structure described above, in general, the operating handle is rotated while supporting the lower end of the milling unit on a table, and on the other hand, in a case where it is desired to perform the milling processing for a short period of time, while the milling unit is grasped with one hand in the air, the operating handle is gripped with the other hand and is rotated. In this way, the shaft portion and the shaft hole are displaced from the shaft center or are relatively inclined, thus wear between the shaft portion and the shaft hole, in particular, wear in the corner portion of the shaft hole caused by the scratch of the rigid shaft portion is significantly performed, and the fitting between the shaft portion and the shaft hole is loosened, with the result that the operating handle is idled or comes off while the rotary operation is performed.

The present invention is made in view of the foregoing points, and an object thereof is to provide a mill device which is compact and easy to carry and which can reliably prevent, when the shaft hole of an operating handle is externally fitted to a shaft portion provided at one end of a drive shaft in the mill device so as to perform rotary drive, the operating handle from being idled by wear between the shaft portion, and the shaft hole and the operating handle from coming off from the shaft portion.

Means for Solving the Problems

In order to achieve the above object, according to the present invention, there is provided a mill device including a milling unit which mills, with a rotary member, an item to be milled; a drive shaft in which one end is cooperatively coupled to the rotary member and in which on the shaft center of the other end, a rectangular shaft portion is formed that has a predetermined twist around at least part of the shaft center in a shaft center direction and that is rectangular in cross section; and an operating handle to which a rectangle shaft hole that is rectangular in plan view is open and which is coupled to the drive shaft by externally fitting the rectangular shaft hole to the rectangular shaft portion.

On the shaft center of the other end of the drive shaft, the rectangular shaft portion which is rectangular in cross section is formed, the rectangular shaft hole which is externally fitted to the rectangular shaft portion and which is rectangular in plan view is open to the operating handle and thus it is possible to prevent the operating handle from being idled. Specifically, both the angle of the outer circumferential side surface of the rectangular shaft portion and the angle of the corner of the inner circumferential side surface of the rectangular shaft hole are right angles, the angle (hereinafter referred to as a "contact angle") between the direction in which the shaft hole is pushed by the rotational force and the outer circumferential side surface of the shaft portion is larger than a case where the shapes of the shaft portion and the shaft hole in cross section are the shape of a regular polygon that is pentagonal or more and thus the inner circumferential surface of the shaft hole is unlikely to slide along the outer circumferential side surface of the shaft portion, with the result that the expansion of deformation of the corner portion of the shaft hole caused by the scratch of the shaft portion can be further reduced.

Furthermore, the rectangular shaft portion described above has the predetermined twist around at least part of the shaft center in the shaft center direction, and thus it is possible to prevent the operating handle from coining off. Specifically, even when the hand with which the operating handle is gripped and rotated is separated from the operating handle so that the rotation operation is stopped during the milling processing or the powder accumulated in the milling unit is removed after the milling processing or even when the operating handle is erroneously pulled outward in the shaft center direction during the rotation operation, the rectangular shaft hole of the operating handle is locked to the region in which a twist is formed in the rectangular shaft portion partway through the sliding, with the result that the further movement of the operating handle outward is stopped.

In a case where partway through the rectangular shaft portion in the shaft center direction, a stable twist region is provided, where a twist whose twist angle change rate is substantially constant is formed, when the operating handle is coupled to the rectangular shaft portion, the operating handle is only slightly rotated in the twist direction, and thus the rectangular shaft hole can smoothly slide to the side of the base end in the shaft center direction while being rotated around the rectangular shaft portion. In this way, while the rectangular shaft hole is engaged with the side of the tip end of the rectangular shaft hole, and then the operating handle is rotated a few revolutions, the rectangular shaft hole automatically slides to the side of the base end in the shaft center direction, and the operating handle is coupled to the rectangular shaft portion. Hence, a coupling operation of previously pressing the operating handle to the side of the base end in the shaft center direction is not needed, and thus the rotation operability is further enhanced.

In a case where on the side of the tip end of the rectangular shaft portion in the shaft center direction, an initial engagement region, is provided that has at least one of a small twist portion whose twist angle change rate is smaller than the stable twist region and a reverse portion which is twisted in a reverse direction with respect to a twist direction in the stable twist region, when the operating handle is coupled to the rectangular shaft portion, without the operating handle being first rotated, the rectangular shaft hole of the operating handle is only lightly pressed to the side of the tip end of the rectangular shaft portion in the shaft center direction, and thus the operating handle can be engaged with the side of the tip end of the rectangular shaft portion in the shaft center direction. In this way, the initial engagement of the operating handle is easily performed and thus the rotation operability is enhanced.

In a case where on the side of the base end of the rectangular shaft portion in the shaft center direction, a holding region is provided that has a small twist portion whose twist angle change rate is smaller than the stable twist region, when the operating handle is coupled to the rectangular shaft portion, the rectangular shaft hole which slides to the side of the base end in the shaft center direction while being rotated around the rectangular shaft portion is smoothly engaged with the small twist portion and is held. In this way, it is easy to position the operating handle, and thus the rotation operability is further enhanced.

In a case where the rectangular shaft portion has a tapered structure in which a surface interval between at least one of two pairs of surfaces that are opposite each other through the shaft center is increased toward the side of the base end in the shaft center direction, when the operating handle is coupled to the rectangular shaft portion, even if variations in the size and the shape of the rectangular shaft portion and the rectangular shaft hole are produced, the fitting property is enhanced on the side of the base end of the rectangular shaft portion in the shaft center direction, and the rectangular shaft hole is reliably engaged with the side of the base end of the rectangular shaft portion and is held. In this way, it is easy to position the operating handle, and thus the rotation operability is further enhanced.

Effects of the Invention

The mill device according to the present invention is compact and easy to carry and can reliably prevent, when the shaft hole of the operating handle is externally fitted to the shaft portion provided at one end of the drive shaft in the mill device so as to perform the rotary drive, the operating handle from being idled by wear between the shaft portion and the shaft hole and the operating handle from coming off from the shaft portion.

BRIEF DESCRIPTION OF THE DRAWINGS

FIG. 1 is a perspective view showing the overall configuration of a coffee mill according to the present invention;

FIG. 2 is an external view of the coffee mill, FIG. 2(a) is a plan view thereof and FIG. 2(b) is a side view thereof;

FIG. 3 is a partially cross-sectional side view of the coffee mill;

FIG. 4 is an exploded perspective view showing the internal structure of the coffee mill when seen from below;

FIG. 5 is an exploded perspective view showing the internal structure of the coffee mill when seen from above;

FIG. 6 is a perspective view of the vicinity of a rectangular shaft portion;

FIG. 7 is an enlarged perspective view of the rectangular shaft portion;

FIG. 8 is a graph showing variations in a twist angle with respect to a length in the shaft center direction;

FIG. 9 is a graph showing variations in a surface interval with respect to the length in the shaft center direction;

FIG. 10 is a plan view of the vicinity of the shaft portion in a coupled state, FIG. 10(a) is a plan view in the ease of the rectangular shaft portion and FIG. 10(b) is a plan view in the case of a pentagonal shaft portion;

FIG. 11 is a graph schematically showing variations in the twist angle with respect to the length in the shaft center direction in various types of twist; and FIG. 12 is a flowchart showing the procedures and the details of the production of samples.

DETAILED DESCRIPTION OF THE PREFERRED EMBODIMENTS

An embodiment of the present invention on a mill device will be described below with reference to the drawings so that the present invention is understood.

A direction indicated by an arrow U in FIG. 1 is assumed to be an upward direction, and the positions, directions, etc., of individual portions which will be described below are with reference to the upward direction.

The overall configuration of a coffee mill 1 that is an example of the mill device to which the present invention is applied will first be described with reference to FIGS. 1 to 5.

The coffee mill 1 includes a milling unit 2 which, mills coffee beans 5 into coffee grounds 5a, a drive shaft 3 in which a lower end is cooperatively coupled to an inner blade 8 that is rotated within the milling unit 2 and an operating handle 4 in which one end is coupled to the drive shaft 3.

Among them, the milling unit 2 and the drive shaft 3 therewith in will be described.

The milling unit 2 includes: a cylindrical container main body 6 in which upper and lower portions are open; a cylindrical outer blade 7 which is unrotatably securely adhered to a lower portion within the container main body 8 and in which a blade shape 7a is formed on the inner circumferential surface the substantially conical inner blade 8 which is described above, which is unrotatably inserted through the lower end of the drive shaft 3 while facing the outer blade 7 and in which a blade shape 8a is formed on the outer circumferential surface and an adjustment nut 9 which is screwed to a screw portion 3a in the lower end of the drive shaft 3. Among them, the inner blade 8 is unrotatably externally fitted via a rotation stop member 10 to the drive shaft 3.

The milling unit 2 further includes: a disc-shaped lid 11 which is removably fitted to the upper end opening 6a of the container main body 6; and a cylindrical storage container 12 which is removably fitted to the lower end opening 6b of the container main body 6 and whose bottom is open upward.

In the milling unit 2 described above, the lid 11, the container main body 6 and the storage container 12 are formed of, for example, synthetic resin, metal or ceramic, and among them, a shaft hole 11a is open substantially in the center of the lid 11 in plan view.

On the shaft center within the container main body 6, a cylindrical shaft support portion 13a is arranged, the shaft support portion 13a is fixed via a fixation portion 13b to the inner wall 6c of the container main body 6 and a bearing 13 is formed with the shaft support portion 13a and the fixation portion 13b. Among them, on the upper and lower ends of the shaft support portion 13a, positioning washers 14 and 15 are externally fitted.

In this way, in the drive shaft 3 described above, its upper end can be inserted through the shaft hole 11a to protrude upward and its halfway portion can be rotatably supported with the positioning washers 14 and 15 on the bearing 13.

The outer blade 7 described above is formed of, for example, ceramic or metal, and in the blade shape 7a, a large-tooth feed blade 7a1 is formed on the inner circumferential surface of its upper portion, its lower end opening edge is formed to be inclined outward while its diameter is increased and a narrow-tooth milling blade 7a2 is formed on the inclination surface.

The inner blade 8 is also formed of, for example, ceramic or metal, and in the blade shape 8a, a large-tooth spiral feed blade 8a1 is formed on the outer circumferential surface of its upper portion, while a narrow-tooth milling blade 8a2 is formed on the outer circumferential surface of its lower portion. Furthermore, in the inner blade 8, a through hole 8b is formed which vertically penetrates the inner blade 8.

Furthermore, the rotation stop member 10 described above is formed of, for example, synthetic resin, and in the rotation stop member 10, a shaft hole 10a is formed which vertically penetrates the rotation stop member 10, the drive shaft 3 described above is inserted through the shaft hole 10a, protrusions 3b, 3b which are provided on the side surface of the lower portion of the drive shaft 3 so as to protrude are locked to the slit portion 10b1 of a shaft portion 10b of the rotation stop member 10 which is protruded upward and thus the rotation stop member 10 can be unrotatably inserted through the drive shaft 3.

The shaft portion 10b is inserted through the through hole 8b of the inner blade 8 from below, thus a flange portion 10b2 on the tip end of the shaft portion 10b is locked to the opening edge of the through hole 8b of the inner blade 8 and a plurality of locking protrusion portions 10b3 formed upward on the outer circumferential surface of the shaft portion 10b are fitted and locked to a plurality of locking concave portions 8c on the lower surface of the inner blade 8, with the result that the rotation stop member 10 can be unrotatably attached to the inner blade 8.

Moreover, the adjustment nut 9 described above is formed of, for example, synthetic resin, and in the adjustment nut 9, a screw hole 9a is formed which vertically penetrates the adjustment nut 9, the screw portion 3a of the drive shaft 3 described above is screwed into the screw hole 9a and above the upper portion of the adjustment nut 9, an annular portion 9b is formed which is rotatably slidably formed on the lower surface of the rotation stop member 10.

In this way, the shaft portion 10b of the rotation stop member 10 is inserted through the through hole 8b of the inner blade 8, thus the inner blade 8 and the rotation stop member 10 are formed integrally by being unrotatably attached to each other, the lower end of the drive shaft 3 is inserted through the shaft hole 10a of the rotation stop member 10 and the protrusions 3b, 3b of the drive shaft 3 are locked to the slit portion 10b1 of the shaft portion 10b, with the result that the inner blade 8 can be unrotatably inserted through the drive shaft 3 via the rotation stop member 10.

Furthermore, the screw portion 3a of the lower end of the drive shaft 3 is screwed into the screw hole 9a of the adjustment nut 9, and thus the milling blades 7a2 and 8a2 of the outer blade 7 which is unrotatably securely adhered to the container main body 6 and the inner blade 8 which is unrotatably inserted through the drive shaft 3 can be arranged opposite each other.

Moreover, on the drive shaft 3 between the above-described positioning washer 15 of the drive shaft 3 and the flange portion 10b2 of the rotation stop member 10, a biasing spring 33 is wound, the adjustment nut 9 which is screwed and fitted to the screw portion 3a is rotated, and thus the inner blade 8 which is integral with the rotation stop member 10 can be pushed to move toward the outer blade 7 against the elastic force of the biasing spring 33. In this way, the interval between the milling blades 7a2 and 8a2 is accurately changed, and thus it is possible to finely adjust the particle size of the coffee grounds 5a.

In the operating handle 4 described above, its one end is removably coupled via a coupling structure 20 which will be described in detail below to the upper end of the drive shaft 3 which is protruded from the shaft hole 11a of the lid 11 in the milling unit 2, and at the other end of the operating handle 4, a grip 16 which is grasped to perform an operation is provided.

In the configuration described above, when the coffee mill 1 is used to perform the milling processing, the operating handle 4 is first removed from the upper end of the drive shaft 3, thereafter the lid 11 of the milling unit 2 is removed upward from the container main body 6 such that the upper end opening 6a is opened and the coffee beans 5 are put from the upper end opening 6a into the container main body 6. Then, the coffee beans 5 which are put thereinto are made to flow down within the container main body 6 and are put into a gap 19 between the cylindrical outer blade 7 and the substantially conical inner blade 8 which is inserted into the outer blade 7 from below.

Thereafter, the upper end opening 6a of the container main body 6 is closed with the lid 11 again, and the one end of the operating handle 4 is coupled to the upper end of the drive shaft 3 protruded from the shaft hole 11a of the lid 11. Then, when the container main body 6 is held with one hand, the grip 16 of the operating handle 4 is grasped with the other hand and the mill device is rotated, the inner blade 8 is rotated, and the coffee beans 5 are ground between the outer blade 7 and the inner blade 8, with the result that the resulting coffee grounds 5a are made to flow down within the inner space of the storage container 12 positioned in the lower portion and are accumulated. Then, the storage container 12 is removed downward from the container main body 6, and then the coffee grounds 5a within the storage container 12 can be removed and used.

Here, the coffee beans 5 are milled in the gap 19 between the feed blade 7a1 on the inner circumferential surface of the upper portion of the outer blade 7 securely adhered within the container main body 6 and the feed blade 8a1 on the outer circumferential surface of the upper portion of the inner blade 8 which is manually rotated in one direction with respect to the outer blade 7, are simultaneously and forcefully fed downward and are more finely milled between the milling blades 7a2 and 8a2 formed on the outer blade 7 and the inner blade 8 so as to be efficiently discharged.

Furthermore, as described above the adjustment nut 9 screwed to the lower end of the drive shaft 3 is used to move the inner blade 8 along the drive shaft 3 forward and backward in the direction of the shaft center, the interval between the milling blades 7a2 and 8a2 is accurately changed and thus the particle size of the coffee grounds 5a is adjusted according to the type of coffee beans 5 and individual preference.

Next, the coupling structure 20 between the drive shaft 3 and the operating handle 4 will be described with reference to FIGS. 6 to 10.

As shown in FIGS. 6 and 10(a), the coupling structure 20 is formed with a rectangular shaft portion 21 which is provided at the upper end of the drive shaft 3 described above on the shaft center 23 and which is rectangular in cross section and a rectangular shaft hole 22 which is open to one end of the operating handle 4 described above, which can be externally fitted to the rectangular shaft portion 21 and which is rectangular in plan view.

Among them, as shown in FIGS. 6 to 8, the rectangular shaft portion 21 has a predetermined twist in which the rectangular shaft portion 21 is twisted around the shaft center 23 of the drive shaft 3 in a counterclockwise direction (hereinafter referred to as a "twist direction") indicated by an arrow 27 when seen from above. In the present embodiment, the twist is formed with the total length of a distance (hereinafter referred to as a "shaft center direction length") L from the rectangular shaft portion 21 to a base end 21c and a twist angle θ of about 4 degrees.

Specifically, in the rectangular shaft portion 21 according to the present invention, as shown by the curves 29 and 30 of FIG. 8, partway through the shaft center direction, a region (hereinafter referred to as a "stable twist region") 25 in which the inclination of the curve (hereinafter referred to as a "twist angle change rate") is substantially constant is provided. The curves 29 and 30 are typical among a plurality of samples of type D which were produced as described below.

On the side of the base end of the rectangular shaft portion 21 in the shaft center direction which is closer to the upper end of the drive shaft 3 than the stable twist region 25, a region (hereinafter referred to as a "holding region") 24 is provided in which a small twist portion 28 whose twist angle change rate is smaller than the stable twist region 25 described above.

Furthermore, on the side of the tip end of the rectangular shaft portion 21 in the shaft center direction which is farther from the upper end of the drive shaft 3 than the stable twist region 25, a region (hereinafter referred to as an "initial engagement portion") 26 is provided in which a small twist portion 31 on the curve 29 whose twist angle change rate is smaller than the stable twist region 25 described above and a reverse portion 32 on the curve 30 the twist direction of which is reverse to that indicated by the arrow 27 described above are formed.

Moreover, in the rectangular shaft portion 21, as shown in FIGS. 7 and 9, a tapered structure 46 is formed in which a surface interval T between a pair of surfaces 43 and 44 on the side of long sides in cross section is increased toward the side of the base end portion of the shaft center 23.

In the tapered structure 46 described above, when the operating handle 4 is coupled to the rectangular shaft portion 21, even if variations in side and shape of the rectangular shaft portion 21 and the rectangular shaft hole 22 are produced, on the side of the base end of the rectangular shaft portion 21 in the shaft center direction, a gap 34 between the rectangular shaft portion 21 and the rectangular shaft hole 22 shown in FIG. 10(a) can be decreased. In this way, the fitting property is enhanced, the rectangular shaft hole 22 is reliably engaged with the side of the base end of the rectangular shaft portion 21 and is held, it is easy to position the operating handle 4 and the rotation operability is further enhanced.

On the other hand, as shown in FIG. 10(a), in the rectangular shaft hole 22, both of a short side 22a and a long side 22b are larger than the outer size of the rectangular shaft portion 21, and thus the gap 34 described above is provided between the rectangular shaft hole 22 and the rectangular shaft portion 21. The gap 34 is set to such a size that the rectangular shaft portion 21 is prevented from being locked within the rectangular shaft hole 22 by the twist.

In the coupling structure 20 described above, when the rectangular shaft hole 22 is coupled to the rectangular shaft portion 21 before the operation of rotating the operating handle 4, without the operating handle 4 being first rotated, the rectangular shaft hole 22 is lightly pressed to the side of the tip end of the rectangular shaft portion 21 in the shaft center direction. Thus, the operating handle 4 is smoothly engaged with the small twist portion 31 described above in the initial engagement region 26 or the twist direction is reversed partway and the operating handle 4 is engaged with the concave reverse portion 32 described above so as to be hung by the reverse portion 32. In this way, the rectangular shaft hole 22 can be reliably engaged with the side of the tip end of the rectangular shaft portion 21, the initial engagement of the operating handle 4 is easily performed and thus the rotation operability is enhanced.

Then, the operating handle 4 is slightly rotated in the twist direction. Thus, the rectangular shaft hole 22 smoothly slides to the side of the base end in the shaft center direction while being rotated around the rectangular shaft portion 21. In this way, while the rectangular shaft hole 22 is engaged with the initial engagement region 26 described above, and then the operating handle 4 is rotated a few revolutions, the rectangular shaft hole 22 automatically slides within the stable twist region 25 to the side of the base end in the shaft center direction, and the operating handle 4 is coupled to the rectangular shaft portion 21. Hence, unlike a conventional mill device, a coupling operation of previously pressing the operating handle 4 to the side of the base end in the shaft center direction is not needed, and thus the rotation operability is further enhanced.

Furthermore, the rectangular shaft hole 22 which slides within the stable twist region 25 to the side of the base end in the shaft center direction is smoothly engaged with the small twist portion 28 described above in the holding region 24 as it is and is held. In this way, it is easy to position the operating handle 4, and thus the rotation operability is further enhanced.

Here, the points in which the coupling structure 20 between the rectangular shaft portion 21 and the rectangular shaft hole 22 described above differs from a coupling structure 37 between a pentagonal shaft portion 35 and a pentagonal shaft hole 36 will be described.

In the case of the coupling structure 37 between the pentagonal shaft portion 35 and the pentagonal shaft hole 38 as shown in FIG. 10(b), when an operating handle 4A is rotated in a clockwise direction indicated by an arrow 38, the inner circumferential side surface 36a of the pentagonal shaft hole 36 presses and moves the outer circumferential side surface 35a of the pentagonal shaft portion 35 in a direction indicated by an arrow 39, and a contact angle between the arrow 39 and the outer circumferential side surface 35a is indicated by a reference numeral 40.

On the other hand, in the case of the coupling structure 20 between the rectangular shaft portion 21 and the rectangular shaft hole 22 in the present embodiment shown in FIG. 10(a), when the operating handle 4 is rotated in the clockwise direction indicated by the arrow 38, the long side 22b of the inner circumferential side surface of the rectangular shaft hole 22 presses and moves the long side 21b of the outer circumferential surface of the rectangular shaft portion 21 in a direction indicated by an arrow 41, a contact angle between the arrow 41 and the long side 21b is indicated by a reference numeral 42 and the contact angle 42 is larger than the contact angle 40 in the case of the pentagonal shaft portion 35 and the pentagonal shaft hole 36 described above. The same is true for a case where the shapes of the shaft portion and the shaft hole in cross section are the shape of a regular polygon that is pentagonal or more.

In the configuration described above, on the shaft center 23 of the other end of the drive shaft 3, the rectangular shaft portion 21 which is rectangular in cross section is formed, and the rectangular shaft hole 22 which is externally fitted to the rectangular shaft portion 21 and which is rectangular in plan view is open to the operating handle 4, with the result that as compared with the case of the coupling structure of the shaft portion and the shaft hole in the shape of a regular polygon that is pentagonal or more, the inner circumferential side surface of the shaft hole is unlikely to slide along the outer circumferential side surface of the shaft portion, the expansion of deformation of the corner portion of the shaft hole caused by the scratch of the shaft hole is reduced and it is possible to prevent the operating handle 4 from being idled.

Furthermore, the rectangular shaft portion 21 has a predetermined twist around at least part of the shaft center 23 in the shaft center direction, and thus even when the hand with which the operating handle 4 is gripped and rotated is separated from the operating handle 4 so that the rotation operation is stopped during the milling processing or the coffee grounds 5a accumulated in the milling unit 2 are removed after the milling processing or even when the operating handle 4 is erroneously pulled outward in the shaft center direction during the rotation operation, the rectangular shaft hole 22 of the operating handle 4 is locked to the region in which a twist is formed in the rectangular shaft portion 21 partway through the sliding, for example, the stable twist region 25, with the result that the further movement of the operating handle 4 outward is stopped and that it is possible to prevent the operating handle 4 from coming off.

The influences of the shapes of the shaft portion and the shaft hole on the idling and the coming off of the operating handle 4, etc., were investigated, and the investigation results will be described with reference to Table 1 and FIGS. 8, 10, 11 and 12.

Production of Samples

As a member of the invention, as shown in FIG. 12, a wire member 47 having a length of 100 mm was cut out from an SUS winding (diameter of 6 mm) for cold forming (step S1), then a flange portion 47a was formed by pressing with a mold on the outer circumferential surface of the wire member 47 (step S2), thereafter a short shaft portion 47b which, was one side of the flange portion 47a was flattened by pressing with a flat plate (step S3), the short shaft portion 47b in the shape of a flat plate was twisted by pressing with a mold again (step S4), a shaft base member 48 having the rectangular shaft portion 21 described above was produced and the shaft base member 48 was processed into the drive shaft 3 described above. The flattened short shaft portion 47b was formed to have a short side of about 3.5 mm and a long side of about 9.8 mm in cross section.

Then, as shown in FIGS. 8 and 11, types of twist were classified into type A in which a substantially constant twist was formed over the entire region in the shaft center direction, type B in which in type A, only on the side of the base end in the shaft center direction, a small twist portion was formed, type C in which in type A, only on the side of the tip end in the shaft center direction, a small twist portion was formed and type D in which as described above, the holding region 24, the stable twist region 25 and the initial engagement region 26 were sequentially formed from the side of the base end in the shaft center direction toward the side of the tip end, and samples (samples 1 to 5) were produced for each of the types of twist. The region, widths of the lengths L of the holding region 24, the stable twist region 25 and the initial engagement region 26 in the shaft center direction were respectively set to about 3 mm, about 4 mm and about 2 mm.

Here, with respect to the twist angle θ of the rectangular shaft portion 21 in each of the samples, an optical non-contact three-dimensional measuring device was used to determine the profile of the rectangular shaft portion 21, and based on data of the profile, for each of the lengths in the shaft center direction with the flange portion 47a being a base point, the rotation angle around the shaft center 23 of the center surface between the surfaces 43 and 44 described above was calculated.

Then, the amount of change in the twist angle θ per 1 mm in the shaft center direction was calculated from the twist angle θ (degrees) described above, and was set to the twist angle change rate described above (degree/mm), the twist angle change rate (degree/mm) was calculated with a pitch of the length of 1 mm and the average value was calculated for each of the holding region 24, the stable twist region 25 and the initial engagement region 26 and was set to the average twist change rate in each region.

As comparison members, a portion in which step S4 was omitted and which was not twisted (sample 6), conventional pentagonal shaft portion and hexagonal shaft portion (samples 7 and 8) and a portion in which substantially the same twist of type D was provided to the conventional hexagonal shaft portion (sample 9) were produced with the same base member.

A soft steel plate having a thickness of about 3 mm was punched in the shape of a handle, then carburizing processing and Ni-plating processing on the surface were sequentially performed and thus operating handles having the rectangular shaft hole 22, the pentagonal shaft hole and the hexagonal shaft hole described above were produced. In the inside of the rectangular shaft hole 22, a short side of about 4 mm and a long side of about 10 mm were formed in plan view.

Test Method

For the idling resistance and the coming off resistance of the operating handle 4, the positioning property with the holding region 24, the automatic coupling property with the stable twist region 25 and the initial engagement property with the initial engagement region 26, the following tests were performed.

For the idling of the operating handle 4, the state of wear of the corner portion of the shaft hole when in a state where the drive shaft 3 was fixed and the operating handle 4 was coupled, reciprocating rotation was performed twenty thousand times on the operating handle 4 with a torque of 10 N·m was observed. When a recess formed in the corner portion caused by sliding with the shaft portion had a depth of 0.3 mm or less, the idling resistance was assumed to be satisfactory (○), whereas when the recess had a depth more than 0.3 mm, the idling resistance was assumed to be unsatisfactory (x).

For the coming off resistance of the operating handle 4, the operating handle 4 was pushed to the root, of the shaft portion of the drive shaft 3 and was coupled thereto, the operating handle 4 was pulled by hand in a direction in which, the shaft hole was moved separately from the drive shaft 3 on the shaft center 23 and when the operating handle 4 was not separated from the shaft, portion, the coming off resistance was assumed to be satisfactory (○), whereas when the operating handle 4 was separated from the shaft portion, the coming off resistance was assumed to be unsatisfactory (x).

For the positioning property with the holding region 24, the operating handle 4 was pushed to the root of the shaft portion of the drive shaft 3 and was coupled thereto, the operating handle 4 was lightly pushed and pulled by hand such that the shaft hole was moved on the shaft center and when the operating handle 4 was not displaced, the positioning property was assumed to be satisfactory (○), whereas when the operating handle 4 was slightly displaced, the positioning property was assumed to be low (Δ).

For the automatic coupling with the stable twist region 25, the shaft hole of the operating handle 4 was engaged with the side of the tip end of the shaft portion, the operating handle 4 was slightly rotated in the twist direction and when the operating handle 4 smoothly slides to the root while being rotated around the shaft portion, the automatic coupling property was assumed to be satisfactory (○), where as when the operating handle 4 did not smoothly slide and stopped partway, the automatic coupling property was assumed to be unsatisfactory (x).

For the initial engagement with the initial engagement region 26, the shaft hole of the operating handle 4 was engaged with the side of the tip end of the shaft portion and when the engagement was able to be achieved only by pressing the shaft hole as it was to the shaft portion, the initial engagement property was assumed to be satisfactory (○), whereas when a slight twist was needed, the initial engagement property was assumed to be low (Δ).

Test Results

In Table 1, the results of the measurements of the idling resistance, the coming off resistance, the positioning property, the automatic coupling property and the initial engagement property described above on samples 1 to 5 of type A, type B, type C and type D according to the present invention and samples 6 to 9 as comparison members of the rectangular shaft portion, the pentagonal shaft portion and the hexagonal shaft portion which were not twisted and the hexagonal shaft portion which was twisted were shown.

TABLE 1

| Category | Sample No. | Shape | Cross section Size (mm) Short side | Cross section Size (mm) Long side | Average twist change rate (degree/mm) Holding region (0~3 mm) | Average twist change rate (degree/mm) Stable twist region (~7 mm) | Average twist change rate (degree/mm) Initial engagement region (~9 mm) | Twist type | Idling resistance | Coming off resistance | Positioning property | Automatic coupling property | Initial engagement property |
|---|---|---|---|---|---|---|---|---|---|---|---|---|---|
| Present invention members | 1 | Rectangular | 3 | 10 | 0.75 over entire region | | | A | ○ | ○ | Δ | ○ | Δ |
| | 2 | Rectangular | 3 | 10 | 0.25 | 0.72 | | B | ○ | ○ | ○ | ○ | Δ |
| | 3 | Rectangular | 3 | 10 | 0.92 | | 0.18 | C | ○ | ○ | Δ | ○ | ○ |
| | 4 | Rectangular | 3 | 10 | 0.27 | 0.61 | 0.49 | D | ○ | ○ | ○ | ○ | ○ |
| | 5 | Rectangular | 3 | 10 | 0.33 | 0.72 | 0.87* | D | ○ | ○ | ○ | ○ | ○ |
| Comparison members | 6 | Rectangular | 3 | 10 | 0 | 0 | 0 | — | ○ | x | ○ | x | ○ |
| | 7 | Regular pentagonal | One side of 4 mm | | 0 | 0 | 0 | — | x | x | ○ | x | ○ |
| | 8 | Regular hexagonal | One side of 3.5 mm | | 0 | 0 | 0 | — | x | x | ○ | x | ○ |
| | 9 | Regular hexagonal | One side of 3.5 mm | | 0.21 | 0.93 | 0.44 | D | x | ○ | ○ | ○ | ○ |

*Reverse portion is present.

In Table 1, on samples 1 to 5 in the example of the present invention, both the idling resistance and the coming off resistance were satisfactory, while on samples 6 to 9 in the comparison example, neither the idling resistance nor the coming off resistance was satisfactory or only one of them was satisfactory.

On samples 1 and 3 having a large twist on the side of the base end of the shaft portion in the shaft center direction, the positioning property was low, on samples 6 to 8 having no twist partway through the shaft center direction, the automatic coupling property was not recognized and on samples 1 and 2 having a large twist on the side of the tip end of the shaft portion in the shaft center direction, the initial engagement property was low.

In other words, on samples 1 to 5 according to the present invention, both the idling resistance and the coming off resistance were enhanced.

Preferably, the length of a short side 21*a* in the cross section of the rectangular shaft portion 21 in FIG. 10(*a*) is equal to or more than 1 mm, and a side ratio which is a ratio of a short side to the long side 21*b* in the cross section of the rectangular shaft portion 21 is 0.2 to 0.8.

In this way, the thickness of the rectangular shaft portion 21 is increased, and thus it is possible to acquire sufficient endurance strength, the rectangular shaft portion 21 has an elongated shape in cross section, and thus it is possible to concentrate the rotational force of the rectangular shaft hole 22 on the long side 21*b* of the rectangular shaft portion 21 and friction between the side surfaces is increased, and thus the rectangular shaft portion 21 is further unlikely to slide, with the result that the expansion of deformation of the corner portion of the rectangular shaft hole 22 can be further reduced.

In this case, when the length of the short side is less than 1 mm, the rectangular shaft portion is so thin as to be easily deformed, and a high-strength member is needed in order to prevent it, with the result that the cost of the components is increased.

When the side ratio is less than 0.2, the rotational force of the rectangular shaft hole 22 concentrated on the long side is excessive, and thus the rectangular shaft portion 21 is likely to be deformed by the rotation operation with the operating handle 4 whereas when the side ratio is more than 0.8, the rotational force of the rectangular shaft hole 22 concentrated on the long side is small, and thus the friction is reduced and the sliding of the rectangular shaft hole 22 is facilitated.

As described above, the mill device to which the present invention is applied is compact and easy to carry and can reliably prevent, when the shaft hole of the operating handle is externally fitted to the shaft portion provided at one end of the drive shaft in the mill device so as to perform rotary drive, the operating handle from being idled by wear between the shaft portion and the shaft hole and the operating handle from coming off from the shaft portion.

DESCRIPTION OF REFERENCE NUMERALS

1: Coffee mill (mill device)
2: Milling unit
3: Drive shaft
4: Operating handle
5: Coffee bean (item, to be milled)
8: Inner blade (rotary member)
21: Rectangular shaft portion
22: Rectangular shaft hole
23: Shaft center
24: Holding region
25: Stable twist region
26: Initial engagement region
28, 31: Small twist portion
32: Reverse portion
46: Tapered structure
T: Surface interval
θ: Twist angle

What is claimed is:

1. A mill device comprising:
a milling unit which mills, with a rotary member, an item to be milled;
a drive shaft in which one end is cooperatively coupled to the rotary member and in which on a shaft center of the other end, a rectangular shaft portion is formed; and
an operating handle that includes a shaft hole that is rectangular in plan view,
wherein the operating handle is coupled to the drive shaft by externally fitting the shaft hole to the rectangular shaft portion,
wherein a cross-section of the rectangular shaft portion is rectangular,
wherein the rectangular shaft portion includes a stable twist region at about a central region of the rectangular shaft portion and wherein the stable twist region is substantially parallel to a shaft center direction,
wherein the stable twist region includes a twist with a twist angle change rate,
wherein on a side of a tip end of the rectangular shaft portion in the shaft center direction, an initial engagement region is provided which comprises:
at least one of an initial engagement twist portion having a twist angle change rate that is smaller than the twist angle change rate of the stable twist region; and
a reverse portion which is twisted in a reverse direction with respect to a twist direction in the stable twist region.

2. The mill device according to claim 1, wherein on a side of a base end of the rectangular shaft portion in the shaft center direction, a holding region is provided that has a holding twist portion having a twist angle change rate that is smaller than the twist angle change rate of the stable twist region.

3. The mill device according to claim 1, wherein the rectangular shaft portion has a tapered structure in which a surface interval between at least one of two pairs of surfaces that are opposite each other through the shaft center is increased toward a side of a base end in the shaft center direction.

* * * * *